US00RE34683E

United States Patent [19]

Maynard et al.

[11] E Patent Number: Re. 34,683

[45] Reissued Date of Patent: * Aug. 2, 1994

[54] CONTROL OF MICROWAVE INTERACTIVE HEATING BY PATTERNED DEACTIVATION

[75] Inventors: Patrick L. Maynard, Combined Locks; Michael A. Schmelzer, Appleton; Thomas D. Pawlowski; David H. Hollenberg, both of Neenah, all of Wis.; Leon Katz, Stamford, Conn.; Gerald J. VanHandel, Neenah, Wis.

[73] Assignee: James River Corporation of Virginia, Richmond, Va.

[ * ] Notice: The portion of the term of this patent subsequent to Sep. 12, 2006 has been disclaimed.

[21] Appl. No.: 673,405

[22] Filed: Feb. 28, 1991

Related U.S. Patent Documents

Reissue of:

[64] Patent No.: 4,883,936
Issued: Nov. 28, 1989
Appl. No.: 239,264
Filed: Sep. 1, 1988

U.S. Applications:

[63] Continuation-in-part of Ser. No. 206,961, Jun. 10, 1988, Pat. No. 4,865,921, which is a continuation of Ser. No. 24,063, Mar. 10, 1987, abandoned.

[51] Int. Cl.[5] ..... H05B 6/80

[52] U.S. Cl. ..... 219/703; 219/759; 426/107

[58] Field of Search ..... 219/10.55 E, 10.55 F, 219/10.55 M, 10.55 R; 426/107, 234, 243; 99/DIG. 14; 428/34.6, 461

[56] References Cited

U.S. PATENT DOCUMENTS

| | | | |
|---|---|---|---|
| 4,190,757 | 2/1980 | Turpin et al. | 219/10.55 E |
| 4,230,924 | 10/1980 | Brastad et al. | 219/10.55 E |
| 4,258,086 | 3/1981 | Beall | 219/10.55 E |
| 4,555,605 | 11/1985 | Brown et al. | 219/10.55 E |
| 4,612,431 | 9/1986 | Brown et al. | 219/10.55 E |
| 4,676,857 | 6/1987 | Scharr et al. | 219/10.55 E |
| 4,735,513 | 5/1988 | Watkins et al. | 219/10.55 E |
| 4,742,203 | 5/1988 | Brown et al. | 219/10.55 E |
| 4,865,921 | 9/1989 | Hollenberg et al. | 219/10.55 E |

FOREIGN PATENT DOCUMENTS

| | | |
|---|---|---|
| 0205304 | 12/1986 | European Pat. Off. . |
| 0317203 | 5/1989 | European Pat. Off. . |
| 8805249 | 7/1988 | PCT Int'l Appl. . |

*Primary Examiner*—Philip H. Leung
*Attorney, Agent, or Firm*—Sixbey, Friedman, Leedom & Ferguson

[57] ABSTRACT

A patterned microwave interactive element and laminate including a patterned microwave interactive element for use in forming food packaging materials that may be employed to store and subsequently cook the food stored therein are provided. The pattern of the microwave interactive element is selected to focus the heat generated to predetermined areas of the food contained in the packaging. Areas where the microwave interactive element has been deactivated may be formed by a variety of methods, such as by demetallization, by the application of an inactivating chemical, by mechanical means and the like, to create a preselected pattern of inactive areas relative to the active areas, thereby controlling the temperatures produced in different sections of the packaging material. Optimum browning and/or crisping of the microwave heated food product may be achieved by selecting a pattern of microwave interactive and inactive areas tailored to specific food products.

28 Claims, 3 Drawing Sheets

CONTROL OF MICROWAVE INTERACTIVE HEATING BY PATTERNED DEACTIVATION

Matter enclosed in heavy brackets [ ] appears in the original patent but forms no part of this reissue specification; matter printed in italics indicates the additions made by reissue.

*This is a continuation-in-part of U.S. Pat. No. 4,865,921, issued on Ser. No. 206,961, filed on Jun. 10, 1988 which is a continuation of Ser. No. 024,063, filed on Mar. 10, 1987, abandoned.*

TECHNICAL FIELD

The present invention relates generally to the production of microwave interactive elements for food packaging and specifically to the production of a microwave interactive element wherein deactivated patterns are formed to control microwave heating at various levels within the same package.

BACKGROUND ART

The increasing popularity of microwave ovens for cooking all or a part of a meal has led to the development of a large variety of food products capable of being cooked in a microwave oven directly in the food packaging in which they are stored. The convenience of being able to cook food without removing it from the package appeals to a great many consumers. Unfortunately, however, currently available packaging for microwavable food products suffers from some significant disadvantages. A major disadvantage is the inability of this packaging to control the amount of microwave energy received by different areas of the food contained within the packaging. Microwave interactive material may be used in the packaging to promote surface browning and crisping of the food. However, because substantially the same amount of microwave energy reaches the entire food item through the packaging, the thinner areas may be dried out and overcooked while the thicker areas may be barely cooked at all. Frozen food products, such as sandwiches, pastries and the like, which have a thick center section and thinner edges are particularly likely to cook unevenly in available freezer-to-microwave oven packaging.

This type of microwavable food package is described by Turpin et al in U.S. Pat. No. 4,190,757, which includes a microwave interactive layer supported on or adjacent to one of the inside container walls for browning the food in the container. The microwave interactive layer described in this patent, however, suffers from the disadvantages discussed above. Moreover, the heat transferred to the food cooked in packaging containing such a layer may vary over the surface area of the food due to surface or dimensional irregularities and variations in size of the food.

A package assembly for storing and then heating food in a microwave oven is disclosed in U.S. Pat. Nos. 4,555,605; 4,612,431 and 4,742,203 to Brown et al and assigned to the same assignee as the present invention. The packaging assembly described in these patents includes a microwave interactive layer on the bottom of a food tray which is used to form a stand enclosing an air space. The air space is described to promote the even distribution of heat to the underside of the food product. This arrangement functions effectively to brown or crisp food items that have a substantially uniform thickness, such as pizza. However, the application of evenly distributed heat energy to a food that varies in thickness is not likely to brown or crisp all areas of the food to the degree required.

U.S. Pat. No. 4,230,924 to Brastad et al. discloses a food packaging material for microwave cooking that converts some of the microwave energy to heat energy to brown the outside of the food and allows the remainder to dielectrically heat the interior of the food. This packaging material is in the form of a transparent flexible dielectric substrate that has been metallized through a mask so that the coating is subdivided into metallic islands separated by dielectric gaps. This flexible material is intended to be wrapped around and conform to the shape of the food product and is disclosed to affect the degree to which the outer surface of the food product browns during microwave cooking. However, the microwave interactive food wrap described in this patent does not provide the desired control over the degree of browning and crispness of microwave cooked food products, and its use, moreover, is limited to those foods like fish sticks that can be wrapped during microwave cooking.

U.S. Pat. No. 4,258,086 Beall discloses the production of a flexible metallized film useful for wrapping food to be browned in a microwave oven. A patterned metal foil master is employed in conjunction with microwave energy to remove portions of the metallic film coating and create an arrangement of metallic islands separated by dielectric gaps substantially identical to that disclosed in the Brastad et al U.S. Pat. No. 4,230,924. Consequently, the Beall microwave wrap suffers from similar disadvantages. Moreover, neither of these patents suggests that the amount of microwave interactive material left on the metallized food wrap affects or has any relationship whatever to the degree of browning or crisping produced in the food cooked in such wrap.

The prior art, therefore, has failed to provide a food packaging material useful for the microwave heating of a wide variety of foods and food products which employs a microwave interactive material that has been selectively deactivated according to a predetermined pattern to focus the heat generated by the microwave interactive material, thus producing varied temperatures on different surfaces of the food as required to brown or crisp the food properly.

SUMMARY OF THE INVENTION

It is, therefore, a primary object of the present invention to provide a food packaging material useful for microwave heating that overcomes the aforementioned disadvantages of the prior art.

It is another object of the present invention to provide a food packaging material useful for the microwave heating of foods that achieves the optimum browning or crisping of a wide variety of food that differ from each other in shape, texture and consistency.

It is yet another object of the present invention to provide a food packaging material useful for the microwave heating of food products including a microwave interactive element deactivated according to a predetermined pattern that directs and focuses the heat energy on selected surfaces of the food product during cooking to produce a properly browned or crisped product.

It is still another object of the present invention to provide a food packaging material useful for the microwave heating of food products that produces different temperatures on different surface areas of the food product.

It is still a further object of the present invention to provide a food packaging material useful for the microwave heating of food products including a microwave interactive element treated to produce surface temperature gradients when the microwave interactive element is subjected to microwave energy.

It is yet a further object of the present invention to provide a food packaging material suitable for the storage and subsequent microwave heating of different foods within the same package.

It is a additional object of the present invention to provide a food packaging material suitable for the storage and subsequent microwave heating of food products that applies individually selected temperatures or heating levels to food products contained therein.

The aforesaid objects are achieved by providing a food packaging material suitable for the storage and subsequent microwave heating of a wide variety of food products. The food packaging material described herein includes a microwave interactive element which allows different levels and amounts of microwave energy to differentially pass through and interact with different areas of the element to produce correspondingly varied temperatures on different surface areas of the food product to achieve the desired degree of browning and crispness. A microwave interactive element which will achieve these results is formed from a microwave interactive material that is selectively deactivated in accordance with a predetermined pattern that will produce a corresponding focused pattern of heat energy onto the food product in contact with the patterned microwave interactive element. The heating activity of the microwave interactive layer is selectively reduced by inactivating a selected area of the interactive material in the microwave interactive material in patterns that may be shaped to correspond to a specific food product, to avoid overlaps or other undesirable heating areas in the package or to produce a gradual temperature gradient across one or more areas of the microwave interactive layer.

Further objects and advantages will be apparent from the following description, claims and drawings.

DESCRIPTION OF THE PREFERRED EMBODIMENTS

Most commercially available packaging for food products intended to be cooked by microwave energy has the overall configuration of a three dimensional rectangular solid, the food product being encased within the walls. This configuration is easily formed from flat two dimensional blanks made of paperboard and the like, which can then be folded to produce a three dimensional container of the desired size. These containers typically include a microwave interactive material that is laminated to the material forming the carton blank. If the microwave interactive material is laminated to the container blank prior to folding, heat-generating areas of the interactive material can overlap each other when the package is assembled. This results in the excessive generation of heat at the areas of overlap and may lead to scorching of the food or the container.

Alternatively, the microwave interactive material may be laminated to a substrate and cut into an appropriate shape and and size prior to insertion into an assembled container. While the microwave interactive laminate may be cut into a shape that approximates that of the food product, the easiest and most economical shape to produce is a rectangle. However, when the food to be packaged in the container with a rectangular microwave interactive laminate is not rectangular but circular, triangular or irregular in shape, heat generating areas of the laminate will not be covered by the food product. The result is that the exposed areas of the microwave interactive laminate can produce excessive heat, which may scorch the food or the container. Moreover, the efficiency of the microwave interactive material is diminished when heat generating areas of the material are not covered by a food product to be heated.

Figure 1:
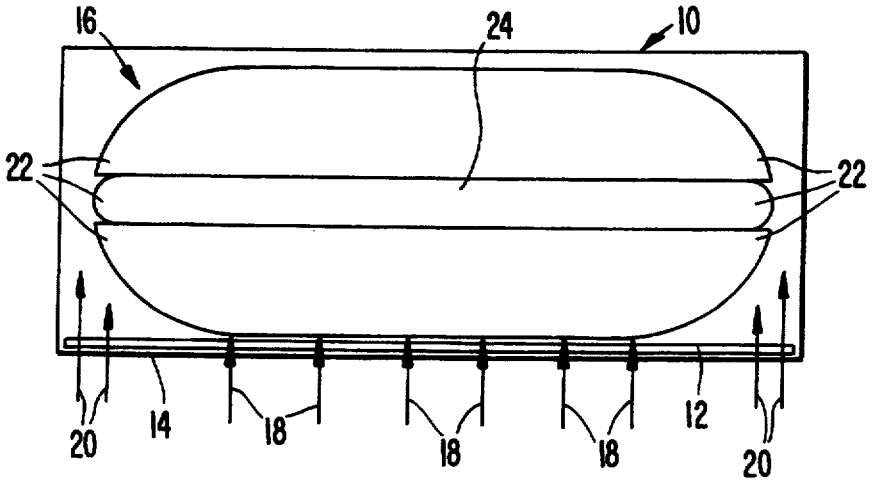
FIG. 1 is a diagrammatic representation of a food product is subjected to microwave energy in a contained includes a prior art microwave interactive element.

FIG. 1 illustrates these problems. The container 10 shown in FIG. 1 includes a microwave interactive element 12 formed by laminating a microwave interactive material (not shown) to a substrate (not shown). The microwave interactive element 12 is made to conform substantially to the shape and size of the bottom wall 14 of the container 10. Enclosed within the container 10 is a sandwich 16 which has a different shape and size than both the container 10 and the microwave interactive element 12. Consequently, when the container 10 i placed in a microwave oven (not shown) to cook the sandwich 16, only the heat generated in the area of arrows 18 will be used to brown or crisp the food. Heat will still be generated in the areas of arrows 20; however, there is no food to absorb the heat energy in these areas. The likely result is that the edges 22 of the sandwich 16 will be overcooked or even toughened, while the center 24 may not be browned or crisped adequately, particularly if the food product shown in FIG. 1 was stored in a frozen state before being cooked in a microwave oven.

The present invention overcomes these problems by providing a microwave interactive material wherein predetermined selected portions of the microwave interactive material are deactivated to render them non-microwave interactive, which results in the focusing of heat energy at the surfaces of the food product corresponding to the non-deactivated portions of the microwave interactive material. These microwave interactive patterns may be easily and conveniently shaped to the size and shape of a food product so that undesirable heating areas in the food packaging are avoided. Moreover, the heating activity may be selectively reduced in different portions of the microwave interactive patterns to heat various surface areas of a food product at different temperatures or to different degrees.

Figure 2:
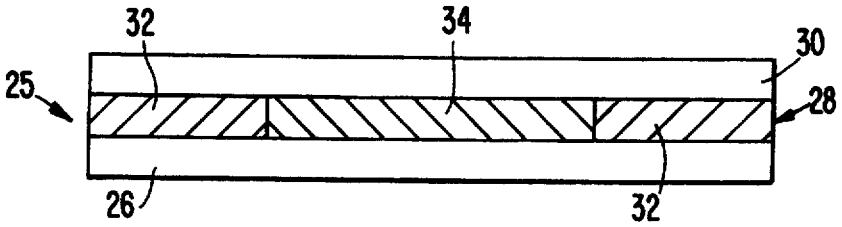
FIG. 2 is a diagrammatic representation of a laminate including microwave interactive element formed according to the present invention.

The production of microwave interactive material with deactivated areas may be accomplished in any manner known to those skilled in the art, but is preferably accomplished according to the process disclosed by U.S. patent application Ser. No. 024,063, filed on Mar. 10, 1987 and assigned to the assignee of the present invention, the disclosure of which is herein incorporated by reference. FIG. 2 illustrates a microwave interactive laminate 25 having active and deactivated areas produced according to the process described in Ser. No. 024,063. The relative sizes of the layers shown are exaggerated for purposes of illustration.

The laminate 25 includes a substrate 26, which may also function as one of the walls of the container comprising the food packaging, that supports a microwave interactive layer 28 formed on a film 30. The microwave interactive layer 28 is preferably positioned between the substrate and the film as shown. The film 30 should be a heat tolerant and stable material capable of supporting microwave interactive material deposited thereon. The microwave interactive layer 28 is a thin layer of material which generates heat in response to microwave energy unless treated to reduce or eliminate this capability. Treatment of the microwave interactive material to reduce or eliminate its microwave interactive capability may be according to the chemical deactivation method described in the aforementioned U.S. patent application Ser. No. 024,063 or mechanically according to the abrasion process described in U.S. patent application Ser. No. 148,483, also assigned to the same assignee as the present invention. The disclosure of Ser. No. 148,483 is herein incorporated by reference. Additionally, other methods of producing a selectively microwave interactive material wherein the heat generating capability is produced according to a preselected pattern are contemplated to fall within the scope of the present invention. For example, selected heat generating capability may be produced according to a desired pattern by printing the microwave interactive material in that specific pattern directly on the film 30 or n the substrate 26.

Sections 32 of layer 28 represent areas of the microwave interactive material that have been chemically deactivated in accordance with the process of Ser. No. 024,063. Section 34 of layer 28 has not been chemically deactivated. Therefore, section 34 remains microwave interactive and capable of generating heat. The substrate layer 26 could be a structure separate from the food packaging container as well as one of the container walls. It is preferred to form the substrate of a material having a relatively high insulating capacity and a heat stability sufficient to withstand cooking temperatures in a microwave oven, such as paperboard, plastics, ceramics and composite materials including, for example, fiber/polymer composites. The film supporting the microwave interactive layer is bonded to the substrate with a suitable adhesive to complete the laminate 25.

The film layer 30 functions both as a base on which the microwave interactive layer 28 is deposited and as a barrier to separate a food product resting on top of the laminate 25 from the microwave interactive layer 28. The film layer 30 must be sufficiently stable at high temperatures when laminated to the substrate 26 so that it is suitable for contact with food at the temperatures reached while the food is being cooked in a microwave oven. Film layer 30 may be formed from a wide variety of stable plastic films, including those made from polyesters, polyolefins, nylon, cellophane and polysulfones. Biaxially oriented polyester is the film material preferred for food containers because of its heat stability and surface smoothness.

The microwave interactive layer 28 may be applied to or deposited on the film 30 by any one of a number of methods known in the art, including vacuum vapor deposition, sputtering, printing and the like. Vacuum vapor deposition techniques, however, are preferred. The microwave interactive layer 28 may be any suitable lossy material that will generate heat in response to microwave radiation. Preferred microwave interactive materials useful in forming layer 28 include compositions containing metals or other materials such as aluminum, iron, nickel, copper, silver, stainless steel, nichrome, magnetite, zinc, tin, iron, tungsten and titanium. Some carbon-containing compositions are also suitable for this purpose. These compositions can be used alone or in combination, and the composition selected may be in the form of a powder, flakes or fine particles. Aluminum metal is the microwave interactive material that is most preferred for many of the applications of the present invention.

The reduction or elimination of the heatgenerating capability of the microwave interactive material 28 may be accomplished by a wide variety of methods, such as, for example, demetallization and deactivation. One type of suitable demetallization method is described in U.S. Pat. No. 4,398,994 to Beckett. However, any demetallization method that results in the removal of the microwave interactive material to produce the desired the desired patterns may be employed. Likewise, deactivation of the microwave interactive material may also be accomplished by any one of a number of deactivation methods capable of producing the desired patterns. Chemical agents suitable for this purpose and the specific techniques for achieving the chemical deactivation of otherwise microwave interactive materials are described in detail in the aforementioned U.S. patent application Ser. No. 024,063. However, any other method and/or material which will deactivate a selected portion of a microwave interactive material without completely removing the deactivated portion could also be used in the present invention. The mechanical deactivation method described in detail in the aforementioned Ser. No. 148,483 is also a suitable way to selectively reduce the capability of the microwave interactive material to generate heat. The goal desired to be achieved by whatever materials and/or method chosen is the production of a layer, like layer 28 in FIG. 2, including some areas (34) that will convert microwave radiation to heat energy and some areas (32) that are no longer capable of converting microwave radiation to heat energy. In this manner the heating capacity or activity of various portions of a microwave interactive material can be selectively reduced. Further, selected areas of reduced heating activity can be positioned as required in a food package so that different areas of a food product can be heated at different temperatures and to different degrees.

Figure 3:
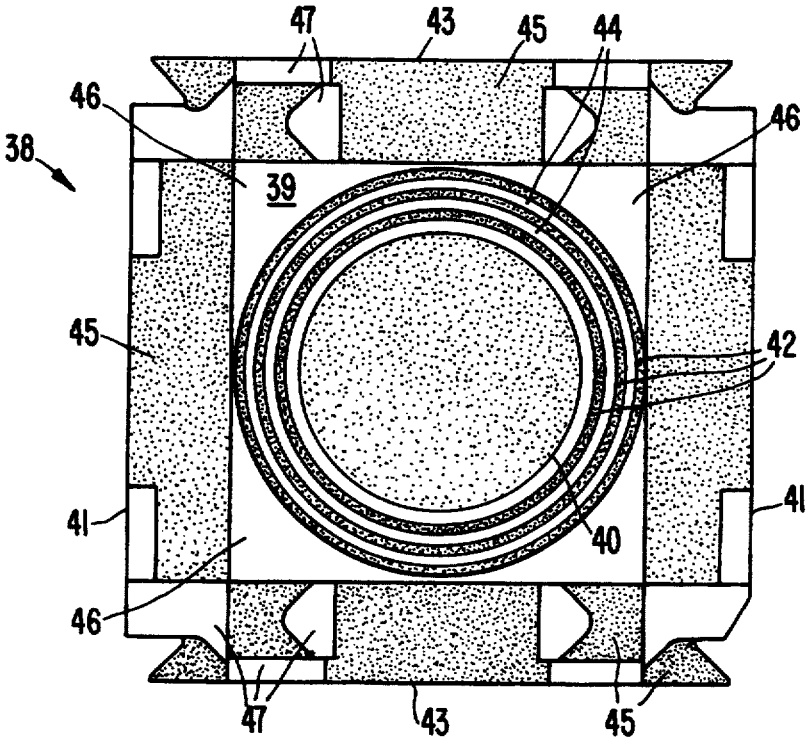
FIG. 3 represents a tray blank including one embodiment of a microwave interactive layer deactivated according to the invention.

The representation of one embodiment of such a patterned microwave interactive layer is shown in the tray blank 38 of FIG. 3. The configuration of activated areas (40, 42) and deactivated (44, 46) areas in the blank 38 has been found to be effective for browning a food that is substantilly round in shape and is relatively thick in the center portion, such as, for example, the round pastry cup containing a filling shown in FIG. 4. The active areas on what will form the bottom 39 when the blank 38 is assembled to form a tray include a central circular area 40 and spaced rings 42 concentric to the circle 40. Side panels 41 and 43 also have active areas 45 selectively positioned to produce only a single layer of microwave interactive material when the tray is assembled. The selective positioning of the active areas 45 thus avoids the excessive heat that is generated when multiple layers of microwave interactive material overlap. The deactivated areas include concentric rings 44 interposed between the active concentric rings 42 and corner areas 46. Side panels 41 and 43 also include deactivated areas 47.

Although the tray blank bottom section 39 will most often form the bottom of the tray, for some food products placing the patterned bottom 39 above the food would produce a more desirable degree of browning or crisping. When a tray formed from blank 38 is subjected to microwave radiation in a microwave oven, the greatest amount of surface heat will be generated in the central circular area 40. This area corresponds to the center of the food load, which is the thickest and requires the most surface heat. A lesser amount of surface heat is generated in the area of concentric rings 42 because these rings are separated by deactivated, non-heat generating rings 44. The edges of the food, which generally require less energy to brown than the center, will be adjacent to these deactivated areas. Corner sections 46 of the boom 39 are also deactivated since there is no food adjacent to those sections to be browned and, therefore, no heat is required in sections 467.

In contrast, the prior art microwave interactive layer 12 in FIG. 1 is fully capable of converting microwave radiation to heat across its entire surface and generates heat in areas where there is no food and it is not required for browning or crisping. By employing a pattern of deactivated and active microwave interactive material, such as that shown in FIG. 3, the microwave energy can be focused, and heat generated only where it is required for browning or crisping the food product adjacent to the microwave interactive layer.

Figure 4:
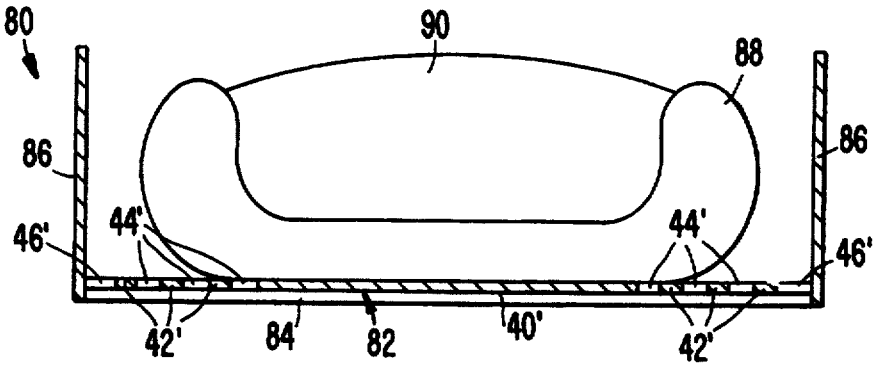
FIG. 4 is a diagrammatic representation of a food product in a tray formed from the blank shown in FIG. 3.

FIG. 4 illustrates diagramatically a food container formed from the tray blank 38 of FIG. 3, which includes a microwave interactive heater 82 with the pattern of microwave interactive and deactivated areas of FIG. 3 in the bottom 84 of the container. The container sidewalls 86 correspond to side panels 41 and 43 in FIG. 3 and form a single substantially continuous microwave interactive layer around the food located in the container. This container is particularly suitable for achieving the optimum browning of a food product, such as the filled pastry cup including a pastry shell 88 and a filling 90 shown in FIG. 4. The central part 40′ of the heater 82 corresponds to the fully metallized circular area 40 in FIG. 3, and the spaced metallized sections 42′ correspond to concentric metallized rings 42 in FIG. 3. The deactivated sections 44′ and 46′ in FIG. 4 correspond to deactivated areas 44 and 46 in FIG. 3. The bottom of the pastry directly contacts the heater 82 and thus can be properly browned. There is little or no contact, however, between the pastry and the sidewalls 86. As a result, the heating produced by the sidewalls is primarily by radiation and, therefore, is less efficient. Consequently, the use of a substantially continuous microwave interactive sidewall does not scorch the pastry.

In most instances, the food heated with the patterned microwave interactive material of the present invention will be in direct contact with this material. However, in some applications, such as, for example, the tray blank side panels 41 and 43 of FIG. 3 used to heat the filled pastry cup in FIG. 4, it may be desirable to provide either an unpatterned or a patterned microwave interactive layer that is no in direct contact with the food but, rather, is spaced some distance from it. Radiant heat will be transferred to a food product in close proximity to such a microwave interactive area in an amount that is inversely proportional to the square of the distance between the microwave interactive material and the food product.

Figure 5:
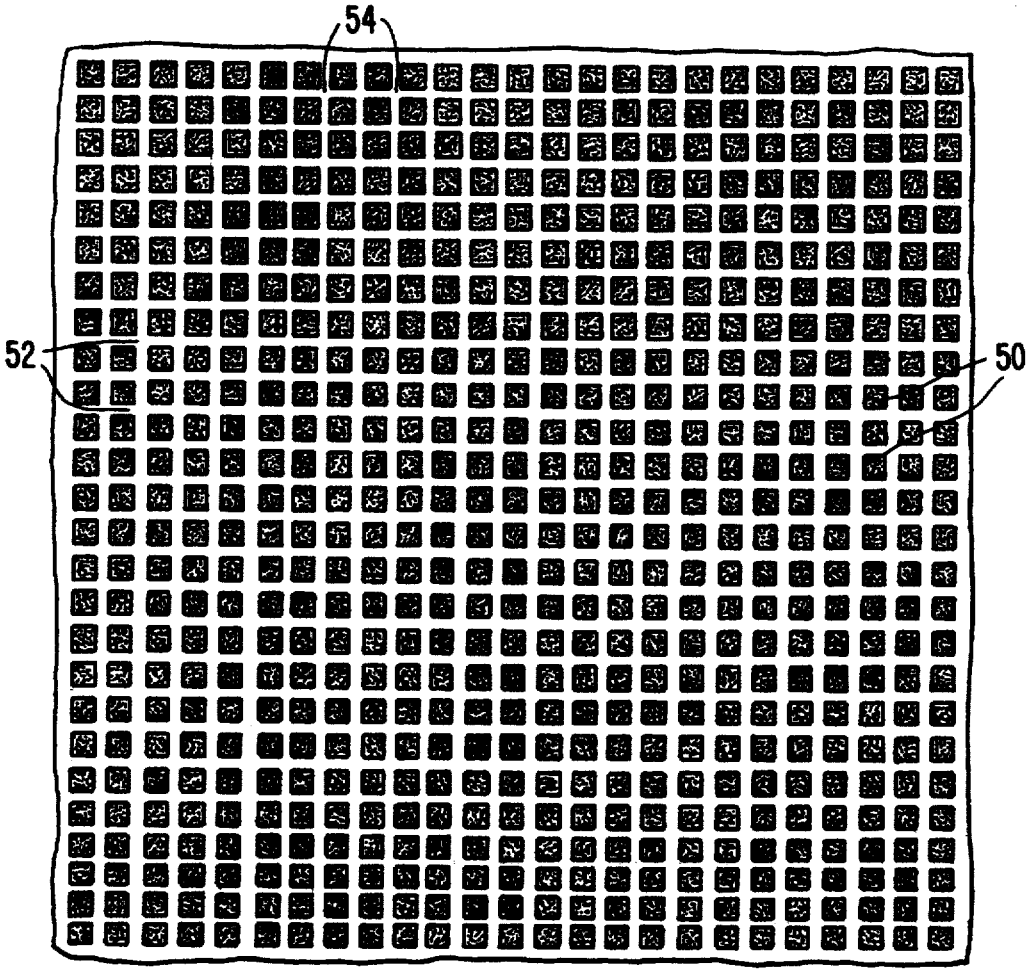
FIG. 5 represents a second embodiment of a microwave interactive layer deactivated according to the present invention.
Figure 7:
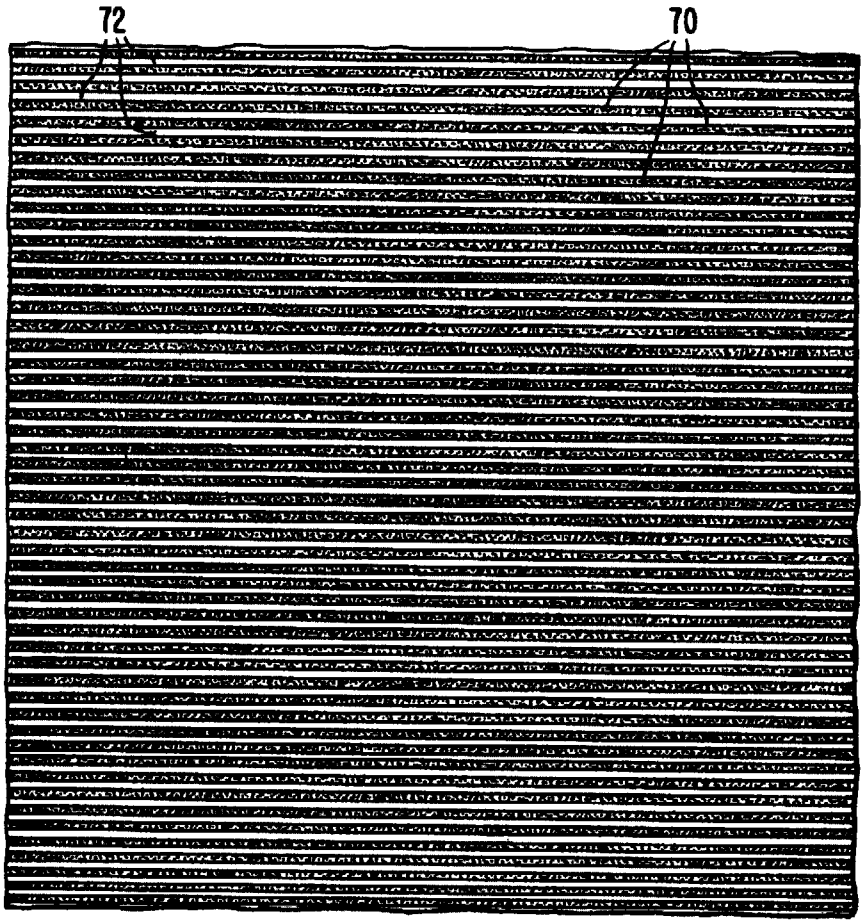
FIG. 7 represents a third embodiment of a microwave interactive layer deactivated according to the present invention.
Figure 6:
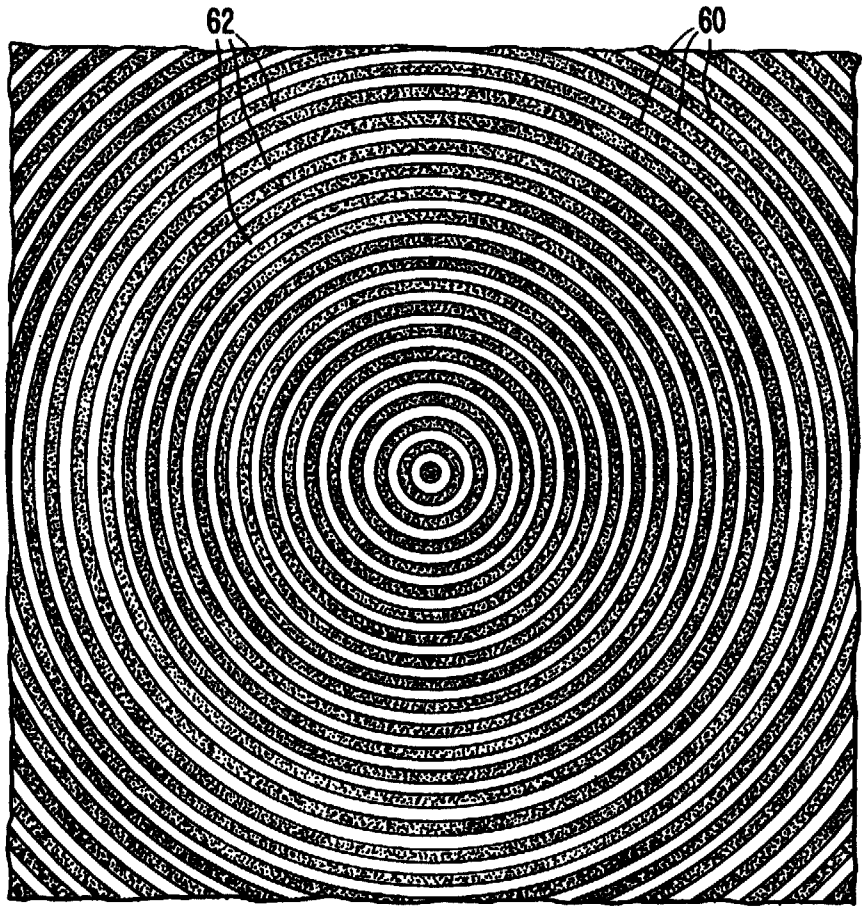
FIG. 6 represents a variation of the FIG. 3 embodiment of microwave interactive layer deactivated according to the present invention.

The types of patterns that may be employed for this purpose are essentially unlimited and may be varied as desired according to the browning or crisping requirements of a particular food product. FIGS. 5–7 illustrate several embodiments of patterns that have been found to focus microwave radiation to generate heat effectively in the heating of a variety of food products. Ideally, to insure optimum browning and crisping, each type of food product should be packaged in a container having a pattern of microwave active and deactivate areas specifically designed for that type of food product. The present invention achieves this objective and facilitates the production of microwave interactive material specifically designed to produce the desired degree of browning and crisping in a particular food product when that food product is heated in a microwave oven. The patterns of FIGS. 5–7 represent patterns of microwave active and deactivated areas that may be employed to optimally brown and crisp a wide variety of different types of food products in a microwave oven.

The patterns shown in FIG. 5–7, which were produced by the chemical deactivation method of Ser. No. 024,063, have been tested to determine the amount of heat actually generated in an area by these patterns. The test data demonstrate that the amount of heating in an area is not highly dependent on the specific pattern, but, instead, depends primarily on and is roughly proportional to the percentage of active area in the pattern. This is not the case, however, if the metal comprising the microwave interactive material is broken into discrete areas smaller than approximately $\frac{1}{8}$ inch$\times\frac{1}{8}$ inch. The formation of discrete interactive areas smaller than this size substantially interferes with the heating capability of the microwave interactive material.

FIG. 5 illustrates a grid pattern in which the squares 50, only two of which are designated by the reference numeral, are areas of microwave interactive material. The parallel horizontal strips 52 and the parallel vertical strips 54 separating the squares form a grid and are areas where the microwave interactive material has been deactivated. Other grid-like patterns in which the "islands" are not squares but circles, ellipses, ovals or the like could also be used. This pattern and two patterns that are essentially the reverse of the FIG. 5 pattern, wherein the squares 50 were deactivated while the strips 52 and 54 remained microwave interactive, were tested to determine the relative percentages of power transmitted, power reflected and power absorbed by samples with these patterns. The percentage of active area remaining in the pattern after the chemical deactivation process described in Ser. No. 024,063 varied from 25% to 75% as indicated in Table I below. The relative peak temperatures were measured in the absence of a competing load in a 700 watt microwave oven using an infrared video system. The power transmission, reflection and absorbance of each sample was measured with a network analyzer and a slotted waveguide applicator.

TABLE I

| Pattern (Screen count: lines/inch) | % Transmitted | % Reflected | % Absorbed | Peak Temp. Deg. F. |
|---|---|---|---|---|
| Squares-4 line: | | | | |
| 20% active | 92.3 | 0.3 | 7.4 | 172.5 |
| 45% active | 77.2 | 0.6 | 22.2 | 307.5 |
| 69% active | 50.6 | 0.7 | 48.8 | 345.0 |
| Grid-4 line: | | | | |
| 21% active | 5.9 | 0.6 | 93.6 | 265.0 |
| 46% active | 0.2 | 2.3 | 97.5 | 305.0 |
| 73% active | 0.0 | 4.1 | 96.0 | 345.0 |
| Grid-20 line: | | | | |
| 3% active | 98.4 | 0.1 | 1.5 | 165.0 |
| 28% active | 17.7 | 0.6 | 81.7 | 265.0 |
| 59% active | 0.0 | 3.1 | 96.9 | 325.0 |

For each of the samples tested above, the results demonstrate that the greater the percentage of active area, the higher the peak temperature reached. Consequently, reduction of the peak surface cooking temperature produced by the pattern can be achieved by removing a greater amount of active area from the microwave interactive material during the deactivation process.

FIG. 6 illustrates a concentric ring pattern different from the on shown in FIG. 3 in that the pattern of microwave interactive areas extends substantially uniformly through the pattern and does not include the large deactivated sections of the FIG. 3 pattern. The dark concentric rings 60 represent areas capable of converting microwave radiation to heat energy, and the light concentric rings 62 represent the chemically deactivated areas. The ring pattern of FIG. 6 was tested on samples as described above in connection with FIG. 5. The results of these tests are presented in Table II below:

TABLE II

| Pattern Rings | % Transmitted | % Reflected | % Absorbed | Peak Temp. Deg. F. |
|---|---|---|---|---|
| 1/16" active ⅛" inactive | 17.8 | 1.3 | 80.9 | 305.0 |
| 1/16" active 1/16" inactive | 7.8 | 1.7 | 90.5 | 325.0 |
| ⅛" active ⅛" inactive | 4.9 | 1.6 | 93.6 | 325.0 |
| ⅛" metal 1/16" space | 3.4 | 1.6 | 94.9 | 345.0 |

FIG. 7 illustrates a parallel line pattern wherein the dark lines 70 represent microwave interactive areas and the light lines 72 represent areas of microwave interactive material that has been chemically deactivated according to Ser. No. 024,063. This pattern was tested as discussed in connection with FIG. 5 in two orientations: with the lines perpendicular to the microwave electric field and with the lines parallel to the microwave electric field. The results of the tests are set forth in Table III.

TABLE III

| Pattern Lines | % Transmitted | | % Reflected | | % Absorbed | | Peak Temp. |
|---|---|---|---|---|---|---|---|
| | par | per | par | per | par | per | Deg. F. |
| 1/16" active ⅛" inactive | 0.0 | 96.2 | 2.8 | 0.2 | 97.2 | 3.7 | 285.0 |
| 1/16" active 1/16" inactive | 0.0 | 93.8 | 4.0 | 0.3 | 96.0 | 6.0 | 325.0 |
| ⅛" active ⅛" inactive | 0.0 | 90.6 | 4.0 | 0.4 | 96.0 | 9.1 | 325.0 |
| ⅛" active 1/16" inactive | 0.0 | 83.1 | 5.1 | 0.6 | 94.9 | 16.4 | 345.0 |

Note: "par" and "per" indicate lines parallel or perpendicular to electric field in the waveguide.

As in the other tests, the greater the area of active material, which in this case and in the case of the concentric ring pattern, represents the microwave interactive area, the higher the peak temperature reached by the sample. The orientation of the microwaves has been found to have an effect on the performance of some of the proposed patterns, for example, the FIG. 7 pattern. However, this is not a matter of concern to the user of a typical household microwave oven, since the microwaves produced by these ovens are random and unoriented.

Using the concepts of the present invention, different patterns can be employed to produce interesting touches on food products. The following examples illustrate two possible applications.

EXAMPLE I

A microwave heater was formed by laminating the patterned microwave interactive material of FIG. 7 to a rectangular substrate approximately 2 inches by 6 inches in size. The alternating strips of the active and deactivated pattern were approximately ⅛ inch wide. An open-ended sleeve sized to fit a hot dog was formed from the rectangle. A cold jumbo size, low-salt Armour brand hot dog was placed in the sleeve and heated in a 700 watt microwave oven for about 60 seconds. When removed from the oven the surface of the heated hot dog had dark parallel "burn" marks about ⅛ inch wide from one end to the other and appeared as if it had been grilled or broiled. The pattern of FIG. 7 effectively heated the portions of the surface of the hot dog in contact with the microwave active strips to a sufficiently high temperature to produce these very dark grill marks, thus giving the hot dog the appearance of having been grilled.

EXAMPLE II

A microwave heater was formed with a pattern that was the reverse of the pattern of FIG. 5, wherein the active areas formed line of the grid and the deactivated areas formed the squares. The lines of active material were approximately 1/16 inch wide, and the inactive "islands" were about 3/16 inch on a side. Pancake batter was poured on the patterned heater. A second identically patterned heater was placed on top of the batter, and the two heaters with the batter in between them were placed in a 700 watt microwave oven and heated for about 2 minutes. After heating, both sides of the "waffle" displayed a waffle-like grid pattern of alternating golden brown squares separated by a grid of dark brown lines. In another test, pancake batter was poured on a heater formed as described above and heated in a 700 watt microwave oven for about 2 minutes without the top heater. The resulting product had a waffle-like-grid only on the side in contact with the patterned heater.

Other possibilities for creating distinctive patterns by the differential browning of food also exist. For example, a pattern including the brand name of the food product or a message of some sort could be created with the microwave interactive areas forming the name or message. When the food product is placed on the film or substrate supporting the microwave interactive layer containing such a pattern, the higher heat produced by the patterned area relative to the surrounding deactivated area will "brand" the surface of the food with the name or message. Other patterns could similarly be used to create desired effects. The variety of patterns that may be created on foods is limited only by the imagination.

Additional, in accordance with the concepts of the present invention, a container for the microwave cooking of food may be provided including a microwave interactive layer which, rather than containing discrete areas capable of producing different temperatures, is characterized by temperature gradients. These may range from fully metallized, microwave active to fully deactivated. Incremental increases in the deactivated area can create such a gradient. When the gradient is subjected to microwave radiation, a corresponding temperature gradient is produced on the surface of the food contacting the microwave interactive material containing the gradient. Deactivation of the microwave interactive material to produce such a gradient can be accomplished the same way a vignette is produced according to the printing arts. The mechanical deactivation method described in Ser. No. 148,483 could also be used to produce such a gradient.

The production of deactivated areas of a microwave interactive material to produce patterns characterized by temperature differences can also be applied to pattern microwave interactive heaters produced by other methods, for example by printed metal or by applying a patterned coating containing microwave interactive material.

It will be apparent to those skilled in the art that various modifications and variations can be made in the present invention without departing from its scope and spirit. Such modifications and variations are intended to fall within the scope of the present invention.

Industrial Applicability

The patterned microwave interactive materials of the present invention will find their primary application in the production of packaging for the storing and subsequent heating of food by microwave energy where it is desired to provide a food product which will be optimally browned and/or crisped. The patterned microwave interactive materials of the present invention can also be employed whenever the differential surface heating of a substance or substances by microwave energy is desired.

We claim:

1. A microwave interactive heating element capable of converting microwave radiation to heat energy to heat a food product proximate to said heating element, wherein said element is formed of a layer of microwave interactive material supported on a substrate and said element includes a plurality of first areas having a reduced capability to generate heat in response to microwave radiation and a plurality of second areas having an unaltered capability to generate heater in response to microwave radiation arranged in a predetermined pattern relative to said first areas, wherein said pattern is formed by selectively deactivating without removing selected areas of said microwave interactive material from said substrate in the predetermined pattern to form said first areas and by leaving the remainder of said predetermined pattern untreated to form said second areas, thereby producing preselected temperature differences in said food product corresponding to said pattern when said heating element is subjected to microwave radiation.

2. The microwave interactive heating element of claim 1, wherein said first areas are arranged alternately with said second areas in concentric rings.

3. The microwave interactive heating element of claim 1, wherein said first areas are arranged to form a grid around said second areas.

4. The microwave interactive heating element of claim 1, wherein said first areas are formed in the shaped of discrete squares separated by a grid formed of said second areas.

5. The microwave interactive heating element of claim 1, wherein said first areas are arranged alternately with said second areas in parallel lines.

6. The microwave interactive heating element of claim 1, wherein the reduced capability of said first area to generate heat in response to microwave radiation is produced by the application of an inactivating chemical to said first area.

*f*7. The microwave interactive heating element of claim 1, wherein the reduced capability of said first area to generate heat in response to microwave radiation is produced by mechanically reducing the amount of microwave interactive material in said first area. ]

8. A microwave interactive heater for insertion into a container intended for the storage and cooking by microwave energy of a food product contained therein, said heater comprising:

a. a supporting film;

b. a microwave interactive material deposited on the entire surface of one side of said film, and c. a substrate supporting said film and said microwave interactive material, wherein first, deactivated areas have been formed in said microwave interactive material by the application of an inactivating chemical to reduce the capability of the first areas to generate heat in response to microwave radiation to create a predetermined pattern of said first areas relative to second areas untreated by said inactivating chemical so that the capability of said microwave interactive material in said second areas to generate heat in response to microwave radiation is not affected by said inactivating chemical.

9. The microwave interactive heater of claim 8, wherein said first areas are arranged alternately with said second areas in concentric rings.

10. The microwave interactive heater of claim 8, wherein said first areas are arranged to form a grid around said second areas.

11. The microwave interactive heater of claim 8, wherein said first areas are formed in the shapes of discrete squares separated by a grid formed of said second areas.

12. The microwave interactive heater of claim 8, wherein said first areas are arranged alternately with said second areas in parallel lines.

13. The microwave interactive heater in claim 8, wherein said first areas are formed by inactivating said microwave interactive material in incremental steps to produce a temperature gradient when said laminate is subjected to microwave radiation.

14. The microwave interactive heater of claim 8, wherein the sections of the food product in contact with said first areas are heated to a lower temperature than the sections of the food product in contact with said second area.

15. A container for packaging several different foods, storing said foods and cooking said foods by microwave energy, said container including a plurality of heaters formed according to claim 8, wherein each heater is positioned in said container in contact with one of said foods and the pattern of first and second areas on said heater is selected to produce the optimum temperature required to brown or crisp the food.

16. A method of producing patterns on the surface of a food product in contact with a heater element heated by microwave energy comprising the steps of:

a. forming a beater element including a microwave interactive material that has been selectively inactivated to produce a preselected pattern of microwave active and microwave inactive areas wherein said microwave active areas are capable of browning the surface of said food product to a significantly greater degree than said microwave inactive areas;

b. placing said food product in contact with said heater element in a microwave oven;

c. subjecting said food product and said heater element to microwave energy for a time sufficient to differentially brown the surface of the food product in a pattern corresponding to said preselected pattern, wherein the surface of the food product in contact with the microwave active areas of said heater is browned to a substantially greater degree than the surface of the food product in contact with the microwave inactive areas of said heater.

17. A method according to claim 16, wherein said food product is a hot dog and said preselected pattern comprise a plurality of parallel lines of alternating active and inactive areas, and in step (b) said hot dog is placed across the parallel lines of the pattern to contact said heater element so that following step (c) the surface of said hot dog is selectively browned in a pattern of parallel lines resembling grill marks.

18. A method according to claim 16, wherein said food product is a pancake and said preselected pattern is a grid of active areas separating islands of inactive areas, and in step (b) said pancake is placed in contact with the grid pattern on the heater element so that following step (c) the surface of said pancake is selectively browned in a waffle-like grid pattern.

19. A method of forming a heating element selectively responsive to microwave radiation for use in the microwave cooking of food products having portions that require browning or heating to different degrees, said method including the steps of:

a forming a layer of microwave interactive material on a substrate to completely cover said substrate;

b. selecting a pattern of microwave interactive and microwave inactive areas that will produce the different amounts of heat required to optimally brown or heat the food product; and c. applying a chemical capable of inactivating said microwave interactive material only to the areas said layer of microwave interactive material corresponding to said microwave inactive areas of said pattern to produce said microwave inactive areas, thereby forming said selectively responsive heating element.

20. The method of forming a heating element described in claim 19, wherein said pattern comprises concentric rings of alternating microwave interactive and microwave inactive areas.

21. The method of forming a heating element described in claim 19, wherein said pattern comprises parallel lines of alternating microwave interactive and microwave inactive areas.

22. The method of forming a heating element described in claim 19, wherein said pattern comprises a grid with said microwave interactive areas forming discrete islands separated by lines of microwave inactive areas.

23. The method of forming a heating element described in claim 19, wherein said pattern comprises a grid with said microwave inactive areas forming discrete islands separated by lines of microwave interactive areas.

*24. A microwave interactive heating element of claim 1, wherein said plurality of first areas are contiguous.*

*25. A microwave interactive heating element of claim 1, wherein said plurality of first areas are noncontiguous.*

*26. A microwave interactive heating element as defined in claim 1, wherein said second areas are contiguous.*

*27. A microwave interactive heating element as defined in claim 1, wherein said second areas are noncontiguous.*

*28. A microwave interactive heating element capable of converting microwave radiation to heat energy to heat a food product proximate to said heating element, wherein said element is formed of a layer of microwave interactive material supported on a substrate and said element includes a first area having a reduced capability to generate heat in response to microwave radiation and a second area having an unaltered capability to generate heat in response to microwave radiation arranged in a predetermined pattern, wherein said pattern is formed by selectively deactivating without removing a selected area of said microwave interactive material from said substrate in the predetermined pattern to form said first area and by leaving the remainder of said predetermined pattern untreated to form said second area.*

* * * * *

UNITED STATES PATENT AND TRADEMARK OFFICE

CERTIFICATE OF CORRECTION

PATENT NO. : RE 34,683
DATED : August 2, 1994
INVENTOR(S) : Patrick L. Maynard et al.

It is certified that error appears in the above-identified patent and that said Letters Patent is hereby corrected as shown below:

Title page,
After [*] Notice: delete "The portion of the term of this patent subsequent to Sep. 12, 2006 has been disclaimed." and insert -- This patent is subject to a terminal disclaimer. -- therefor.

Signed and Sealed this

Tenth Day of June, 2003

JAMES E. ROGAN
*Director of the United States Patent and Trademark Office*